(12) United States Patent
Attanasio

(10) Patent No.: US 8,757,591 B1
(45) Date of Patent: Jun. 24, 2014

(54) DRAIN PLUG FOR AIRCRAFT

(76) Inventor: Gerald E. Attanasio, Middlebury, CT (US)

( * ) Notice: Subject to any disclaimer, the term of this patent is extended or adjusted under 35 U.S.C. 154(b) by 156 days.

(21) Appl. No.: 13/406,521

(22) Filed: Feb. 27, 2012

(51) Int. Cl.
*F16K 31/44* (2006.01)

(52) U.S. Cl.
USPC .............................. 251/251; 251/143; 251/339

(58) Field of Classification Search
USPC ......... 251/251, 252, 229, 339, 144, 145, 143, 251/153, 100, 351; 184/1.5; 220/303
See application file for complete search history.

(56) References Cited

U.S. PATENT DOCUMENTS

| 2,800,245 | A | * | 7/1957 | Doyle et al. | 220/373 |
|---|---|---|---|---|---|
| 2,915,762 | A | * | 12/1959 | Kivela | 4/295 |
| RE28,844 | E | * | 6/1976 | Dehar | 251/144 |
| 4,303,222 | A | * | 12/1981 | Campbell | 251/7 |
| 4,679,618 | A | * | 7/1987 | Farkas | 165/71 |
| 5,197,567 | A | * | 3/1993 | Rabalais | 184/1.5 |
| 5,722,451 | A | * | 3/1998 | Godeau et al. | 137/315.01 |
| 6,237,639 | B1 | * | 5/2001 | Jougla et al. | 137/899.2 |
| 6,886,808 | B2 | * | 5/2005 | Sarno | 251/353 |
| 7,159,731 | B2 | * | 1/2007 | Kai | 220/203.05 |
| 7,357,225 | B2 | * | 4/2008 | Dorian | 184/1.5 |
| 2002/0166988 | A1 | * | 11/2002 | Degutis et al. | 251/144 |
| 2006/0266971 | A1 | * | 11/2006 | Tonelli | 251/216 |

* cited by examiner

*Primary Examiner* — John Bastianelli
*Assistant Examiner* — Andrew J Rost
(74) *Attorney, Agent, or Firm* — Raymond A. Nuzzo

(57) ABSTRACT

A drain plug has a stud that has a head and a shaft joined to the head. A resilient swell sleeve is frictionally mounted on the shaft and is sized to fit within a drainage hole. First and second cams are mounted on the shaft. The first cam abuts the swell sleeve and does not rotate with the shaft. The second cam rotates with the shaft. Rotating the stud in a first direction causes the first and second cams to engage each other so as to produce an axial force that causes the swell sleeve to swell so as to create a seal between the swell sleeve and the drainage hole. Rotating the stud in a second direction terminates the axial force thereby allowing the swell sleeve to return to its normal shape so that the drain plug can be loosened from the drainage hole.

14 Claims, 15 Drawing Sheets

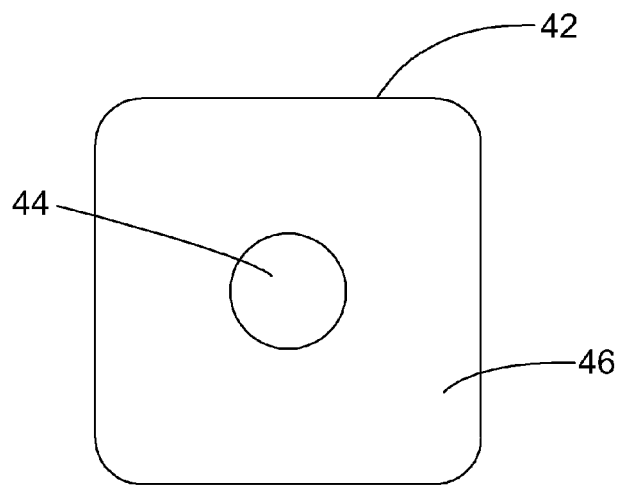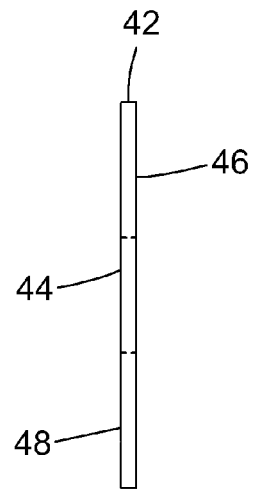
FIG. 5A  FIG. 5B
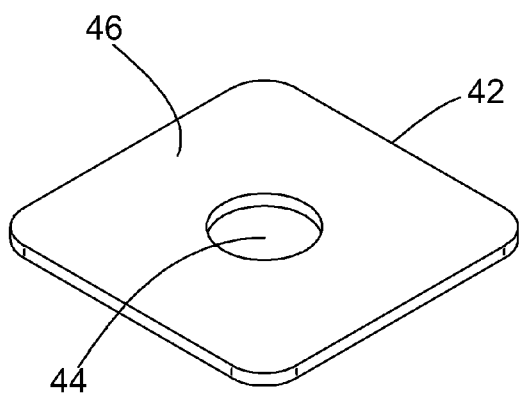
FIG. 5C

DRAIN PLUG FOR AIRCRAFT

CROSS-REFERENCE TO RELATED APPLICATIONS

None.

TECHNICAL FIELD

The present invention generally relates to a drain plug which is configured for use on aircraft but which may be used for other purposes as well.

BACKGROUND ART

Drain plugs are widely used in the aircraft industry. Drain plugs are used all over an aircraft to drain condensation and water build-up in the belly of the aircraft. Many prior art drain plugs are typically bulky and are made from metals such as stainless steel, titanium, alloys, etc. A significant disadvantage of such drain plugs is their relatively high weight. Some prior art drain plugs have weights that exceed 20 grams. Typically, an aircraft utilizes hundreds, if not thousands, of drain plugs. Thus, the accumulated weight of all such drain plugs on an aircraft is significant and affects aircraft weight, performance and fuel performance. Another disadvantage of the aforesaid prior art drain plugs is the relatively high manufacturing costs. This is because stainless steel, titanium and other alloys are expensive and the cost of these metals is susceptible to frequent fluctuations in the market prices of these metals.

What is needed is a drain plug that addresses the problems and disadvantages of prior art drain plugs.

DISCLOSURE OF THE INVENTION

The present invention is directed to a drain plug for use in a drainage hole in a structure wherein the structure has an interior side and an exterior side. The structure may be a part of an aircraft wherein the exterior side of the structure is accessible to service and maintenance personnel. The drain plug comprises a stud member comprising a head portion that has a top side and a bottom side, wherein the top side has a tool receiving recess for receiving a tool. The stud member includes a shaft joined to the bottom side of the head portion. The shaft comprises a first section, an intermediate section having a predetermined size and geometrical shape, and a distal end section attached to the intermediate section. The intermediate section is between the first section and distal end section. The distal end section has a through-hole therein. The drain plug further comprises a resilient swell sleeve frictionally mounted on the first section of the shaft. The swell sleeve has a centrally located, axially extending bore in which the shaft is disposed. The swell sleeve comprises a washer portion that has a first diameter, an interior side and an exterior side. The swell sleeve further comprises a cylindrical portion joined to the interior side of the washer portion. The cylindrical portion has a lengthwise end and a second diameter that is less than the first diameter. The second diameter allows the cylindrical portion to fit through a drainage hole in the structure while the first diameter of the washer portion prevents the washer portion from passing through the drainage hole. The interior side of the washer portion contacts the portion of the exterior side of the structure that surrounds the drainage hole. The swell sleeve is fabricated from a resilient material that allows the cylindrical portion to compress when an axial force is applied to the lengthwise end of the cylindrical portion such that the diameter of the swell sleeve increases to a third diameter that is greater than the second diameter. The third diameter prevents removal of the drain plug from the drainage hole and creates a high-integrity sealing relationship between the swell sleeve and the drainage opening. A first cam member is mounted on the first section of the shaft and abuts the lengthwise end of the swell sleeve. The first cam comprises a cam surface and an end having a plurality of projections thereon that sink into the resilient material of the swell sleeve when an axial force is applied to the first cam member so as to prevent the swell sleeve from rotating about the shaft. A second cam member is mounted on the intermediate section of the shaft and has a cam surface that engages the cam surface of the first cam member. The predetermined size and geometrical shape of the intermediate section causes the second cam member to rotate with the shaft when the shaft is rotated. When the stud member is rotated in a first direction, the cam surface of the second cam member moves upon the cam surface of the first cam member in a first direction so as to exert an axial force upon the first cam member and the swell sleeve in order to cause the diameter of the cylindrical portion of the swell sleeve to increase to the third diameter. When the stud member is rotated in an opposite, second direction, the cam surface of the second cam member moves upon the cam surface of the first cam member in the opposite, second direction which terminates the axial force on the first cam member thereby allowing the diameter of the cylindrical portion of the swell sleeve to return to the second diameter.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which:

FIG. 5A is a top view of a face plate shown in FIG. 1A;

FIG. 5B is a side view, in elevation, of the face plate;

FIG. 5C is a perspective view of the face plate;

BEST MODE FOR CARRYING OUT THE INVENTION

Figures 1A, 1B:
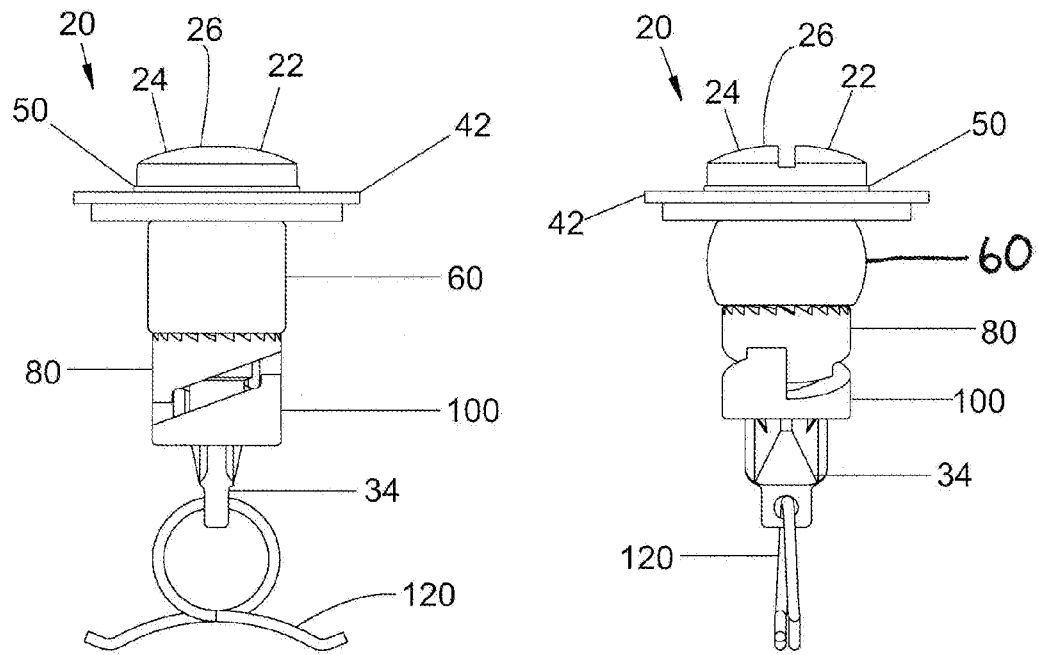
FIG. 1A is a front view, in elevation, of a drain plug in accordance with one embodiment of the present invention.
FIG. 1B is a side view, in elevation, of the drain plug of FIG. 1A.
Figure 2:
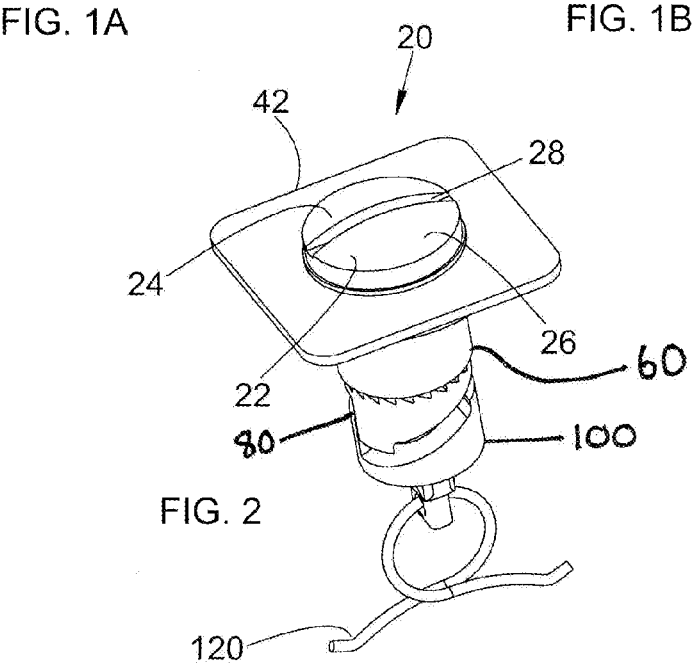
FIG. 2 is a perspective view of the drain plug of FIG. 1A.
Figure 3A:
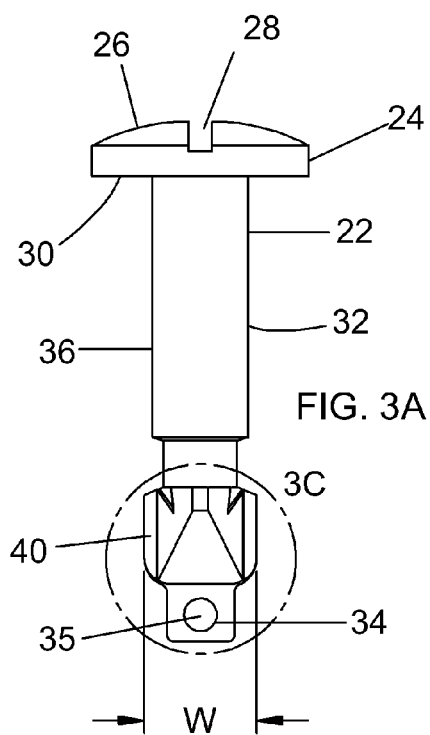
FIG. 3A is a front view, in elevation, of a stud member shown in FIG. 1A, the rear view being essentially the same.
Figure 3B:
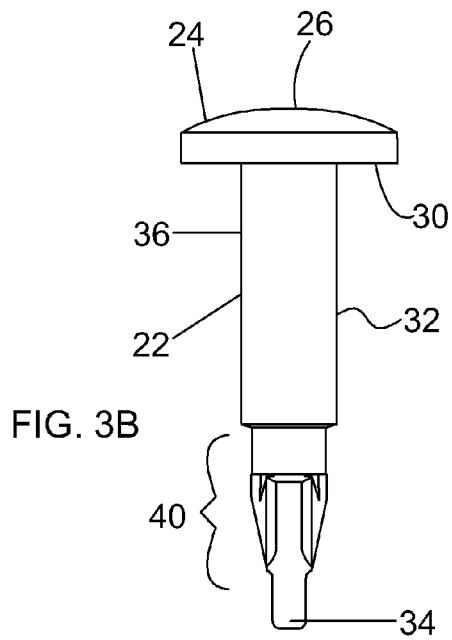
FIG. 3B is a side view, in elevation, of the stud member shown in FIG. 3A.
Figure 3C:
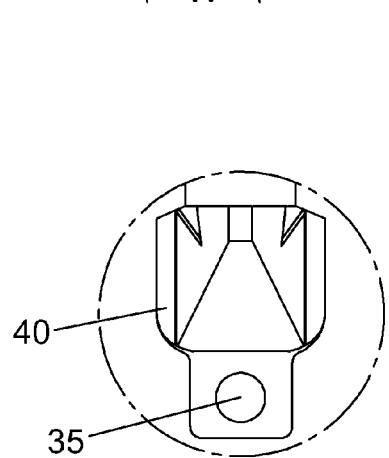
FIG. 3C is an enlarged view of a portion of the view shown in FIG. 3A.
Figure 3D:
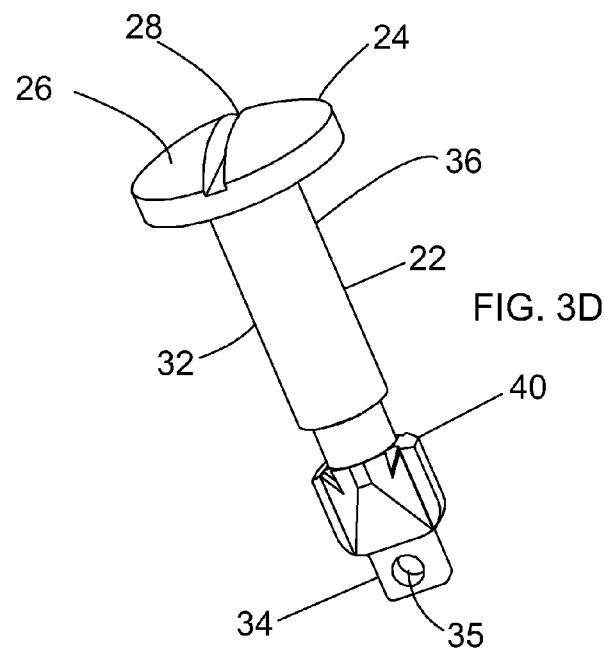
FIG. 3D is a perspective view of the stud member shown in FIG. 3A.
Figure 4A:
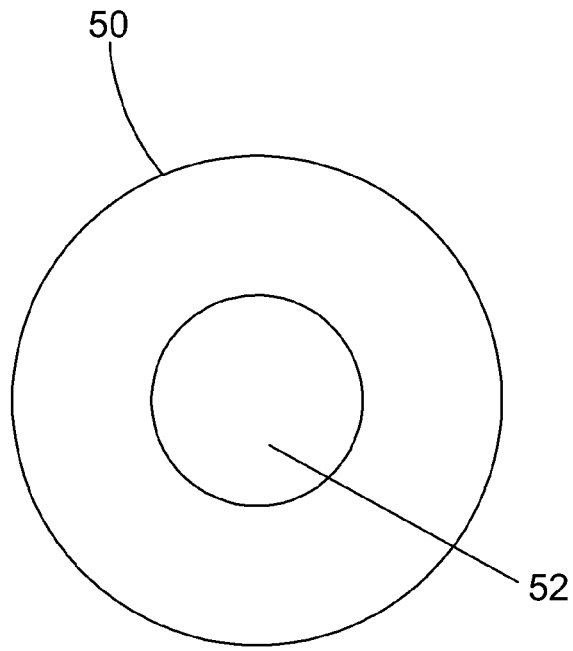
FIG. 4A is a top view of a friction washer shown in FIG. 1A.
Figure 4B:
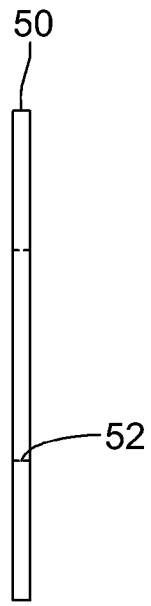
FIG. 4B is a side view, in elevation, of the friction washer.
Figure 4C:
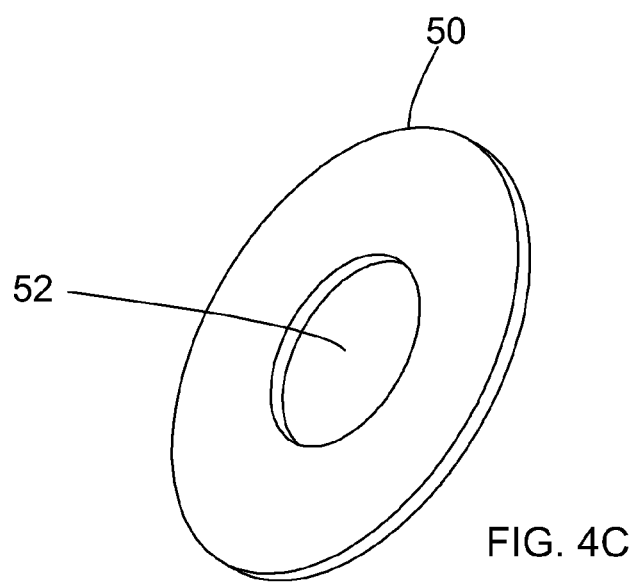
FIG. 4C is a perspective view of the friction washer.

Referring to FIGS. 1A, 1B, 2 and 3A-D, there is shown drain plug 20 in accordance with one embodiment of the present invention. Drain plug 20 comprises stud member 22. Stud member 22 comprises head portion 24 which has top side 26 that has tool recess 28 configured to receive a tool. In one embodiment, tool recess 28 is configured to have a shape of a slot. Head portion 24 further includes bottom side 30. Stud member 22 comprises shaft 32 that is joined to bottom side 30 of head portion 24 and which extends to distal end section 34. Distal end section 34 has through-hole 35. Shaft 32 comprises first section 36 which has a first predetermined size and shape. Shaft 32 further comprises intermediate section 40 which has a second predetermined size and shape. Intermediate section 40 is located between distal end section 34 and first section 36. The second predetermined shape of intermediate section 40 is significantly different than the first predetermined shape of first section 36. In accordance with one embodiment of the present invention, first section 36 has a substantially cylindrical shape and predetermined diameter. In accordance with the invention, intermediate section 40 has a generally flat geometry and a width W (see FIG. 3A) that is greater than the predetermined diameter of first section 36.

In one embodiment, stud member 22 is fabricated from aluminum. In another embodiment, stud member 22 is fabricated from composite material. Preferably, the composite material is a resin. One suitable resin is marketed under the trademark Noryl®. The resin sold under the trademark Noryl® is modified polyphenylene ether (PPE)/polyamide (PA) resin blends that combine PPE's dimensional stability low water absorption and heat resistance with PA's chemical resistance and flow characteristics. In one embodiment, the resin is Noryl® GTX830-1710 resin. This type of resin is impervious to aviation fuel, hydraulic fluids and most hydrocarbons. In another embodiment, the composite material is carbon or glass-filled polyetheretherketone. The material polyetheretherketone is known in the industry by the abbreviation "PEEK". In yet another embodiment, the composite material is an extruded glass-reinforced polyethermide. One suitable extruded glass-reinforced polyethermide is marketed under the trademark ULTEM®. In a further embodiment, the composite material is a hi hhgth plastic or thermoplastic. A suitable high-strength plastic or thermoplastic is marketed under the trademark TORLON®. Other suitable composite materials may be used.

Referring to FIGS. 1A, 1B and 2, 5A, 5B and 5C, drain plug 20 further comprises face plate 42 that is mounted on stud member 22. Face plate 42 has central opening 44 through which shaft 32 extends. Face plate 42 has top side 46 and bottom side 48. In one embodiment, face plate 42 is fabricated from aluminum. In a preferred embodiment, face plate 42 has radiused corners. The purpose of face plate 42 is explained in detail in the ensuing description.

Referring to FIGS. 1A, 1B, 4A, 4B and 4C, drain plug 20 further comprises friction washer 50. Friction washer 50 has central opening 52 that receives stud member 22. As shown in FIGS. 1A and 1B, shaft 32 is disposed within central opening 52 of friction washer 50. Friction washer 50 is positioned between head portion 24 and face plate 42. In one embodiment, friction washer 50 is fabricated from nylon.

Figure 8B:
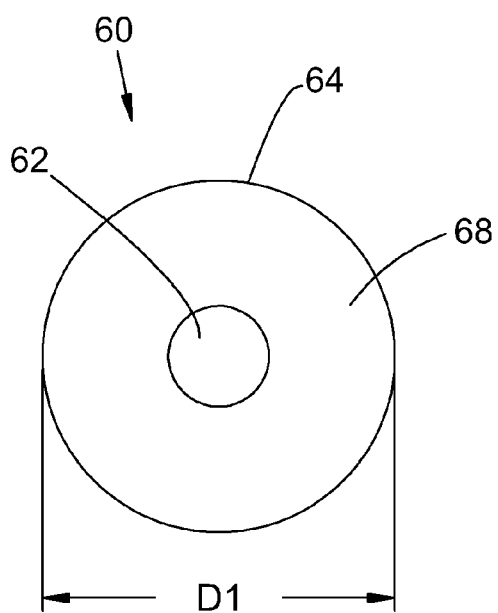
FIG. 8B is a top view of the anti-rotation, swell sleeve of FIG. 8A.
Figure 8A:
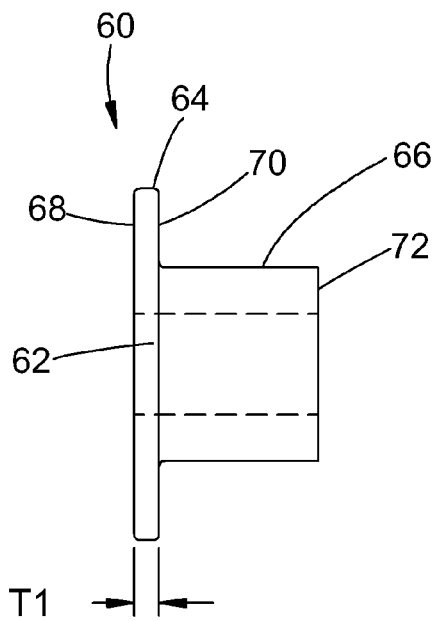
FIG. 8A is a side view of an anti-rotation, swell sleeve shown in FIG. 1A.
Figure 8C:
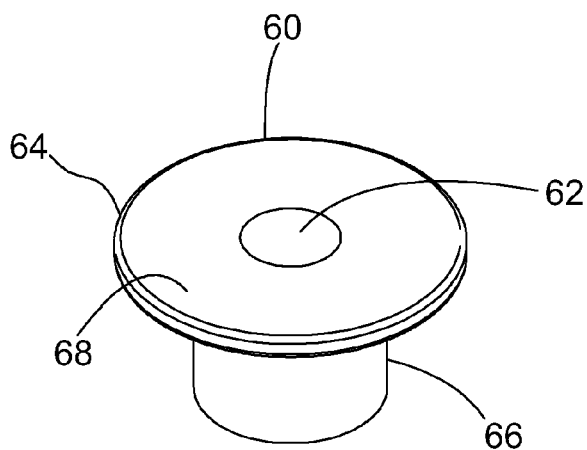
FIG. 8C is a perspective view of the anti-rotation, swell sleeve of FIG. 8A.
Figure 8D:
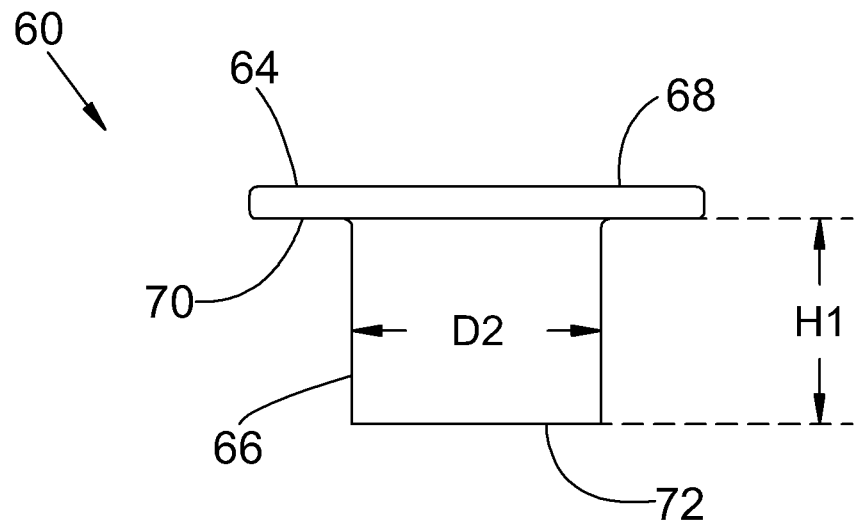
FIG. 8D is a side view, in elevation, of the anti-rotation, swell sleeve in an uncompressed state.
Figure 8E:
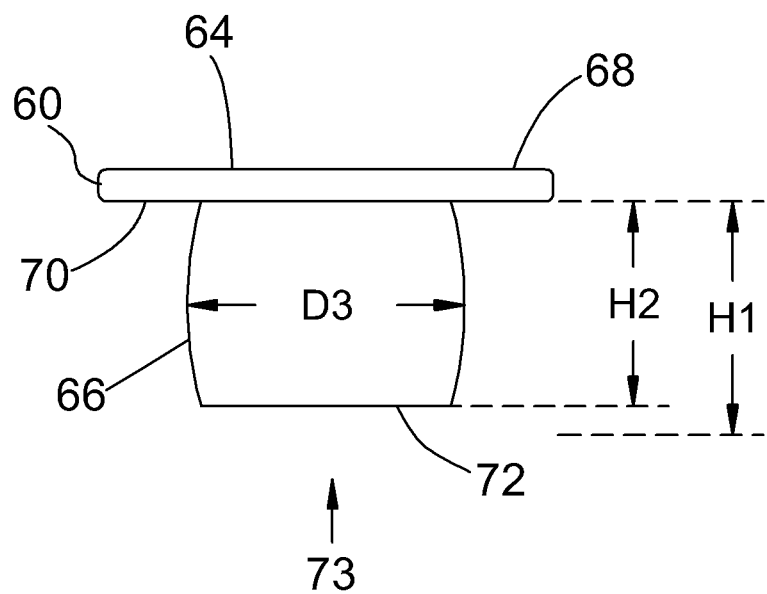
FIG. 8E is a side view, in elevation, of the anti-rotation, swell sleeve in a compressed state.
Figure 9A:
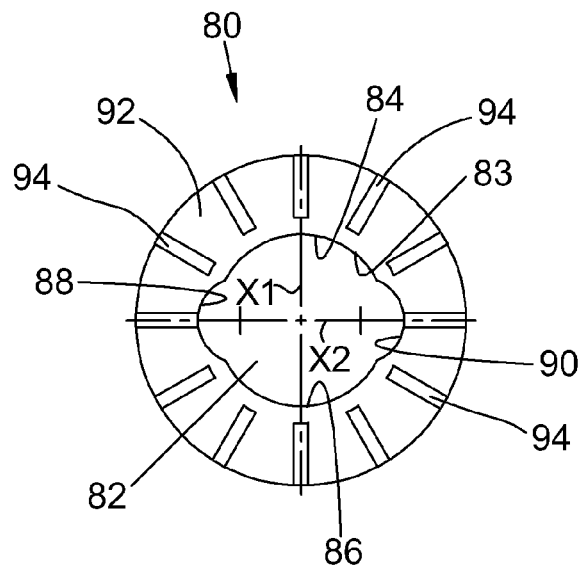
FIG. 9A is top view of a first cam member shown in FIG. 1A.
Figure 9B:
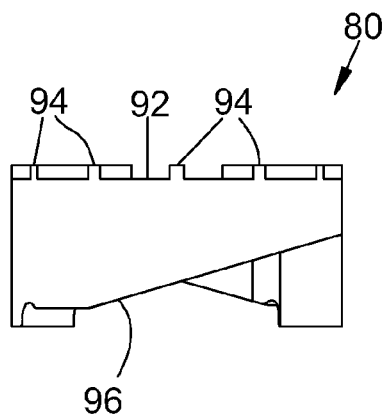
FIG. 9B is a side view, in elevation, of the first cam member of FIG. 1A.
Figure 9C:
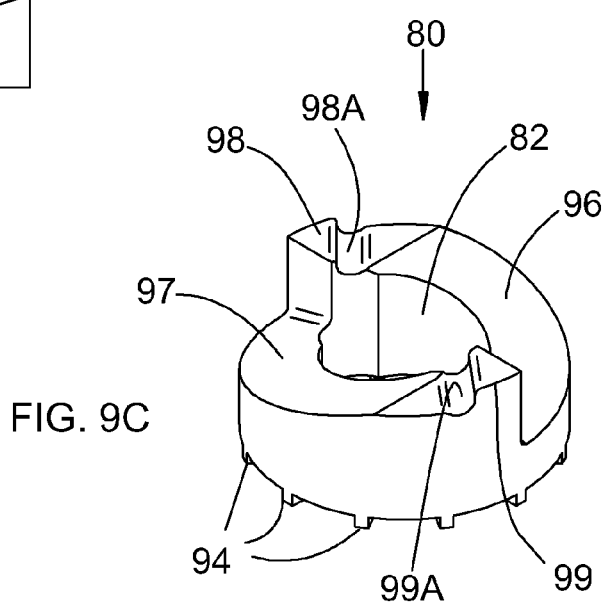
FIG. 9C is a perspective view of the first cam member of FIG. 9A.
Figure 10A:
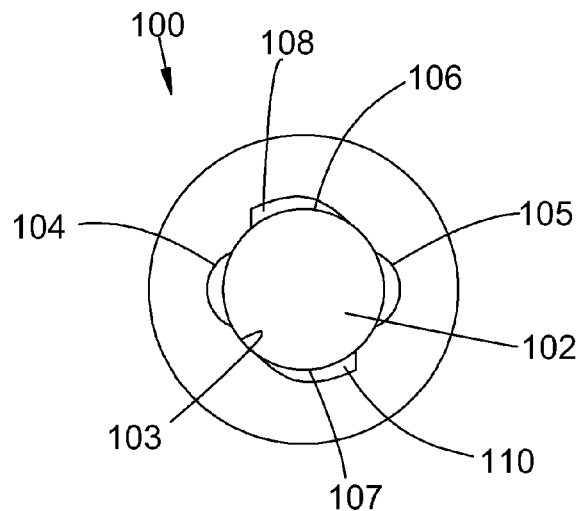
FIG. 10A is a top view of a second cam member shown in FIG. 1A.
Figure 10B:
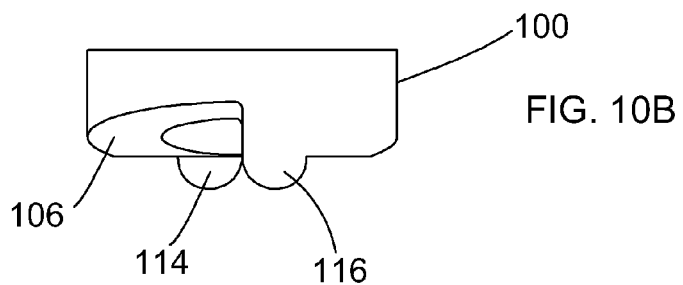
FIG. 10B is a side view, in elevation, of the second cam member of FIG. 10A.
Figure 10C:
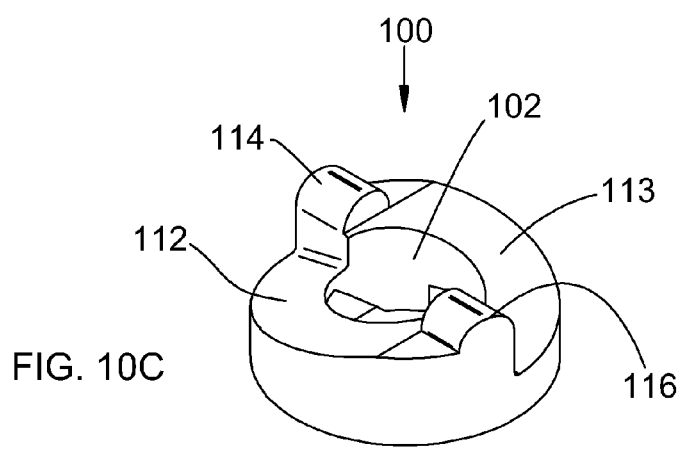
FIG. 10C is a perspective view of the second cam member of FIG. 10A.

Referring to FIGS. 1A, 1B and 8A-E, drain plug 20 further comprises anti-rotation, swell sleeve 60. Swell sleeve 60 has centrally located, axially extending passage or bore 62 that is sized to frictionally receive first section 36 of shaft 32 but prevent swell sleeve 60 from rotating about first section 36. Swell sleeve 60 comprises washer portion 64 that has a substantially circular shape. Washer portion 64 has diameter D1 and thickness T1. Swell sleeve 60 includes cylindrical portion 66 that is joined to washer portion 64 and has a substantially cylindrical shape. Cylindrical portion 66 has a diameter D2 and uncompressed height H1 (see FIG. 8D). Diameter D1 of washer portion 64 is larger than diameter D2 of cylindrical portion 66. Washer portion 64 has top side 68 and bottom side 70. Cylindrical portion 66 has end 72. When an axial force, indicated by reference number 73 in FIG. 8E, is applied against end 72, cylindrical portion 66 becomes compressed thereby causing cylindrical portion 66 to swell. This "swelling" causes the diameter of cylindrical portion 66 to increase from diameter D2 to diameter D3 and the height to decrease from height H1 to height H2. Diameter D3 is still significantly less than diameter D1 of washer portion 64. When the axial force 73 is terminated or withdrawn from end 72, the diameter of cylindrical portion 66 resumes to its normal, uncompressed diameter D2 and the height of the cylindrical portion 66 returns to height H1. The purpose of this feature and characteristic is discussed in the ensuing description. In one embodiment, sleeve swell 60 is fabricated from fluorosilicone rubber. Other suitable materials providing the same operational characteristics may be used.

Referring to FIGS. 1A, 1B, 9A, 9B and 9C, drain plug 20 further comprises first cam member 80. Cam member 80 is mounted on shaft 32. Cam member 80 has central opening 82 through which shaft 32 extends. Central opening 82 has an inner wall 83 that comprises a first pair of diametrically positioned arcuate wall portions 84 and 86 that are formed in accordance with a first radius, and a second pair of diametrical positioned arcuate wall portions 88 and 90 that are formed in accordance with a second radius. The distance X1 between portions 84 and 86 is less than the distance X2 between portions 88 and 90. As a result of this particular geometry of central opening 82, the rotational movement of cam member 80 about shaft 32 is very limited. In one embodiment, the range of rotational movement of cam member 80 is less than 10 degrees. Cam member 80 includes surface 92 which has formed thereon a plurality of teeth members or projections 94. Teeth members 94 frictionally abut end 72 of cylindrical portion 66. Since swell sleeve 60 is fabricated from a relatively soft rubber, teeth members 94 sink into the resilient material of swell sleeve 60 and thus attain a high degree of friction. In a preferred embodiment, teeth members 94 are equidistantly spaced. Cam member 80 further includes cam surfaces 96 and 97. The cam surfaces 96 and 97 are separated by cam stops 98 and 99. Cam detent 98A is adjacent to cam stop 98. Cam detent 99A is adjacent to cam stop 99.

Referring to FIGS. 1A, 1B, 10A, 10B and 10C, drain plug 20 further comprises cam member 100 that is mounted on shaft 32. Specifically, cam member 100 has central opening 102 through which shaft 32 extends. Central opening 102 has an inner wall 103 that comprises diametrically positioned arcuate wall portions 104 and 105, and diametrically positioned wall portions 106 and 107. Wall portion 106 has a sloping raised or stepped portion 108. Similarly, wall portion 107 has a sloping raised or stepped portion 110. The size of central opening 102 and structure of inner wall 103 results in a tight, frictional relationship between inner wall 103 and intermediate section 40 of shaft 32 thereby preventing cam member 100 from rotating about intermediate section 40. Thus, cam member 100 rotates with stub member 22 when stub member 22 is rotated, but cam member 100 cannot rotate relative to stub member 22. Cam member 100 has cam surfaces 112 and 113 that are separated by diametrically positioned cams 114 and 116. The rotational or angular movement of stud member 22 is limited by the maximum distance cam member 100 is allowed to move upon cam member 80. This maximum distance is determined by cam stops 98 and 99 of cam member 80. This feature is described in detail in the ensuing description.

Referring to FIGS. 1A, 1B, 9A, 9B, 9C, 10A, 10B and 10C, when cam member 80 and cam member 100 are mounted on shaft 32, cam 116 of cam member 100 frictionally contacts cam surface 97 of cam member 80, and cam 114 frictionally contacts cam surface 96 of cam member 80. As described in the ensuing description, the extent of rotation of cam member 100 upon cam member 80 is limited by cam stops 98 and 99 of cam member 80. As cam member 100 moves clockwise, cam 116 frictionally moves upon cam surface 97 and cam 114 frictionally moves upon cam surface 96. Cam member 100 can rotate in the clockwise direction until the maximum allowable rotation has been achieved. The maximum allowable rotation has been achieved when cam 116 of cam member 100 contacts cam stop 99 of cam member 80 and slips into cam detent 99A, and cam 114 of cam member 100 contacts cam stop 98 of cam member 80 and slips into cam detent 98A. When cam member 100 rotates the maximum allowable distance in the clockwise direction, it becomes locked with cam member 80 in a first position.

When cam member 100 moves counter-clockwise, cam 116 frictionally moves upon cam surface 97 of cam 80 and cam 114 frictionally moves upon cam surface 96 of cam member 80. Cam member 100 can rotate in the counter-wise direction until the maximum allowable rotation has been achieved. The maximum allowable rotation has been achieved when cam 116 contacts cam stop 98 of cam member 80, and cam 114 contacts cam stop 99 of cam member 80. When this occurs, cam members 80 and 100 becomes configured in a second position. Since cam member 100 always rotates with stud member 22 and never rotates about stud member 22 (i.e. does not rotate relative to stud member 22), the range of rotational movement of stud member 22 is determined by the maximum allowable rotation of cam member 100 in the clockwise and counter-clockwise directions.

When stud member 22 is rotated the maximum distance in a clockwise direction, cam member 100 also rotates in the clockwise direction. As cam member 100 rotates in the clockwise direction, it applies an axial force against cam member 80. This axial force is transferred to end 72 of cylindrical portion 66 of swell sleeve 60 which compresses cylindrical portion 66 thereby increasing its diameter to diameter D3 and reducing its height to height H2. This was previous shown in FIG. 8E. A user can continue to rotate stud member 22 in the clockwise direction until cam member 100 moves the maximum allowable distance and becomes locked in the first position with cam member 80. When stud member 22 is rotated in the counter-clockwise direction, cam member 100 is withdrawn from the first position and moves in a counter-clockwise direction until it moves the maximum allowable distance and becomes locked in the second position with cam member 80. When second cam member 100 is locked in the second position, the axial force exerted against cam member 80 is terminated. As a result, cylindrical portion 66 of swell sleeve 60 returns to its normal, uncompressed diameter D2 and height H1. This was previously shown in FIG. 8D.

Figure 11:
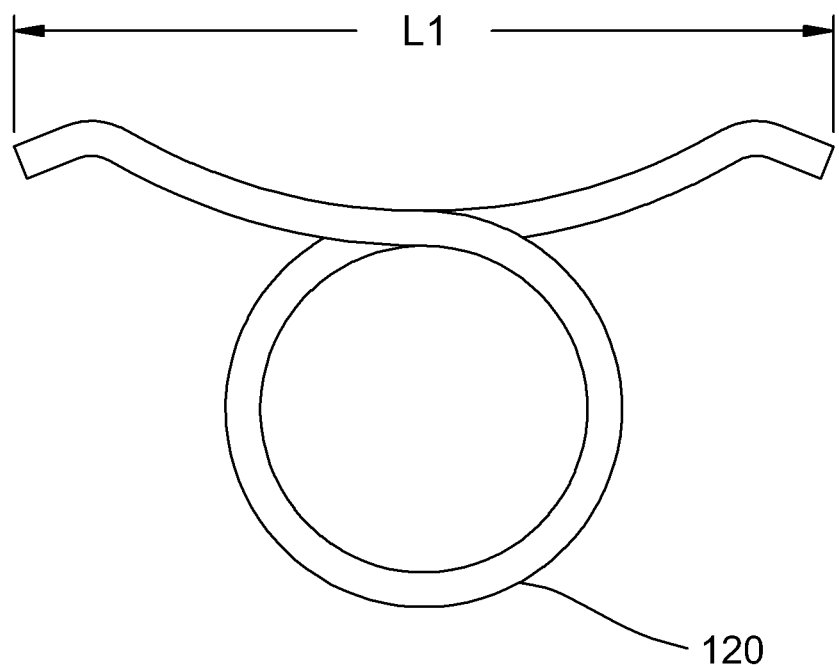
FIG. 11 is a front view of a safety wire form shown in FIG. 1A, the rear view being essentially the same.

As shown in FIG. 11, drain plug 20 includes safety wire form 120. As shown in FIGS. 1A and 1B, safety wire form 120 is disposed in through-hole 35 of distal end section 34. The length L1 of safety wire form 120 is substantially equal to diameter D1 of washer portion 64 of swell sleeve 60. The purpose of safety wire form 120 is discussed in the ensuing description. In one embodiment, safety wire form 120 is fabricated from metal, such as aluminum. In another embodiment, safety wire form 120 is fabricated from a composite material such as Noryl. Other suitable materials can be used as well.

Figure 12A:
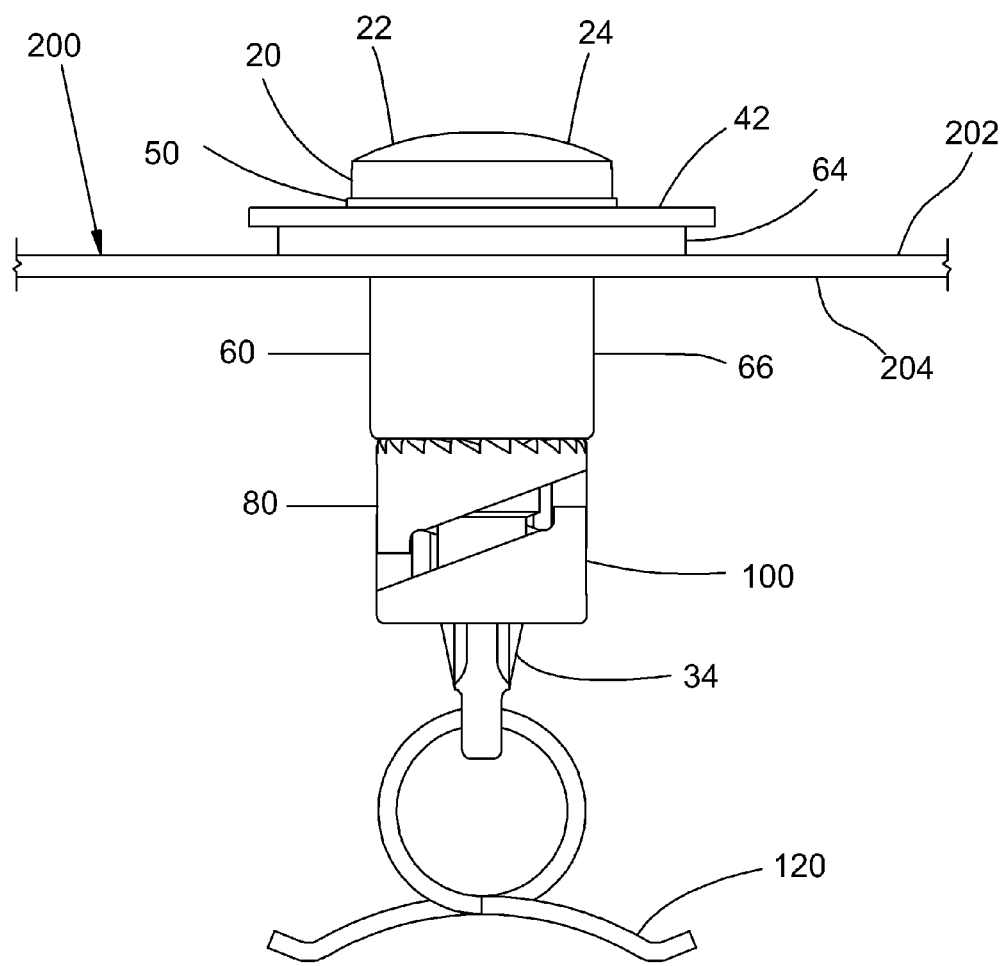
FIG. 12A is side view showing the drain plug of the present invention mounted to an aircraft structure, the swell sleeve being in an uncompressed state.
Figure 12B:
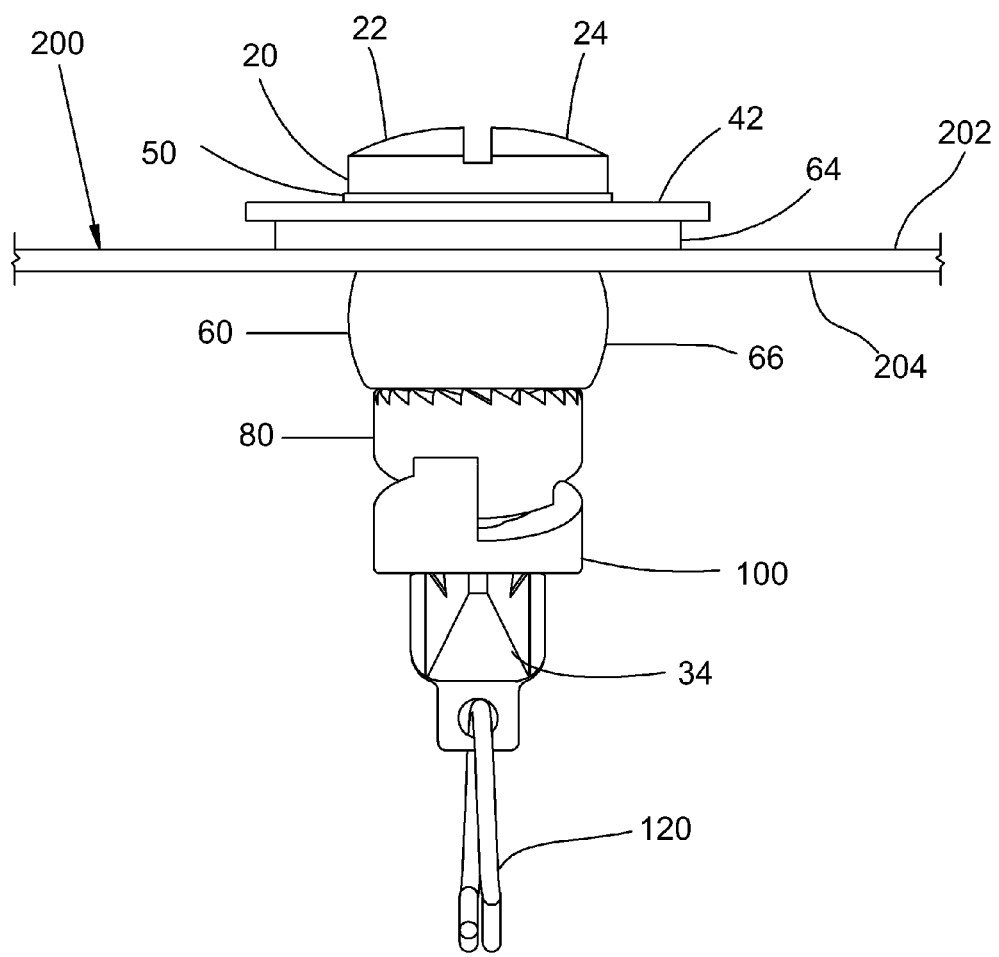
FIG. 12B is side view showing the drain plug of the present invention mounted to an aircraft structure, the swell sleeve being in a compressed state.

Referring to FIG. 12A, there is shown a side view of drain plug 20 mounted to the structure 200 (e.g. interior wall, etc.) of an aircraft. Structure 200 has exterior side 202 and interior side 204. Structure 200 has a drainage hole that has a diameter for receiving cylindrical portion 66 of swell sleeve 60 but not washer portion 64. Bottom side 70 of washer portion 64 firmly contacts side 202 of structure 200. Side 48 of face plate 42 firmly contacts top side 68 of washer portion 64. Friction washer 50 firmly contacts top side 46 of face plate 42. Bottom side 30 of stud head 24 firmly contacts friction washer 50. The diameter of the drainage hole in structure 200 is greater than uncompressed diameter D2 of cylindrical portion 66 but is less than the compressed diameter D3 of cylindrical portion 66. Thus, drain plug 20 can be removed from the drainage hole in structure 200 when cylindrical portion 66 is in its normal, uncompressed state and its diameter is diameter D2. Referring to FIG. 12B, when cylindrical portion 66 "swells" to diameter D3, a seal is created between swell sleeve 60 and the drainage hole in structure 200. This seal prevents any fluid from draining out through the drainage hole in structure 200. Drain plug 20 cannot be removed from structure 200 when the diameter of cylindrical portion 66 swells to diameter D3.

Figure 13:
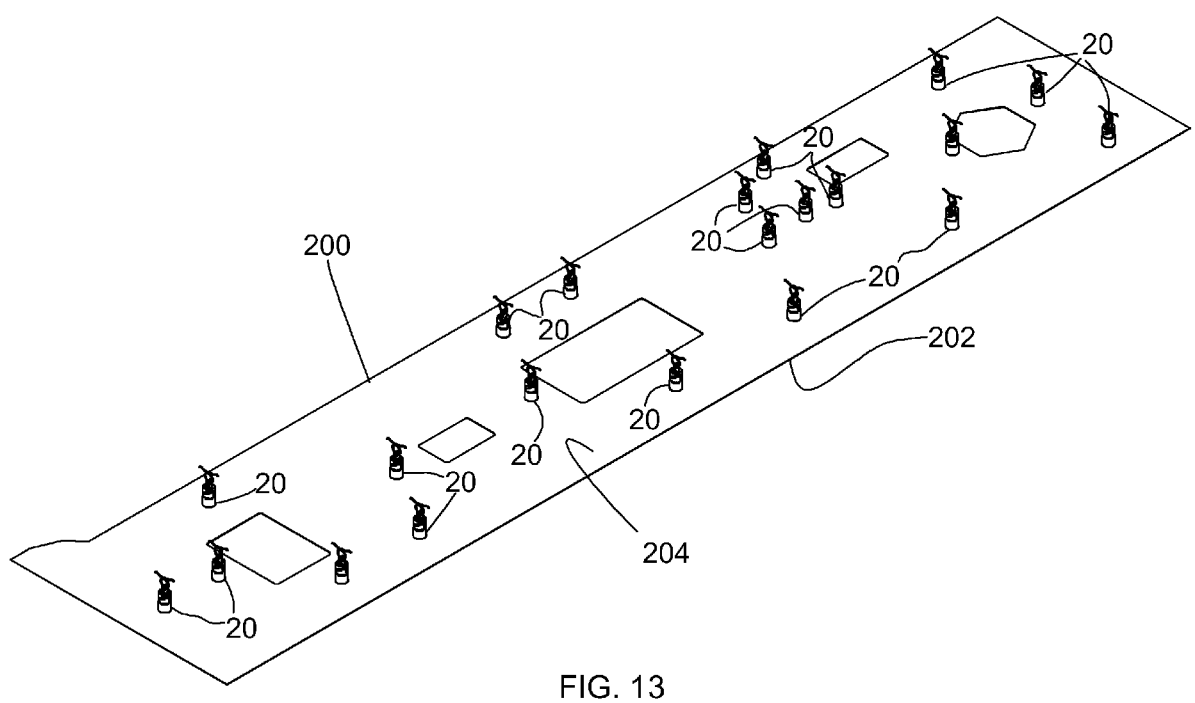
FIG. 13 is a perspective view showing a plurality of drain plugs mounted to an aircraft structure.
Figure 14:
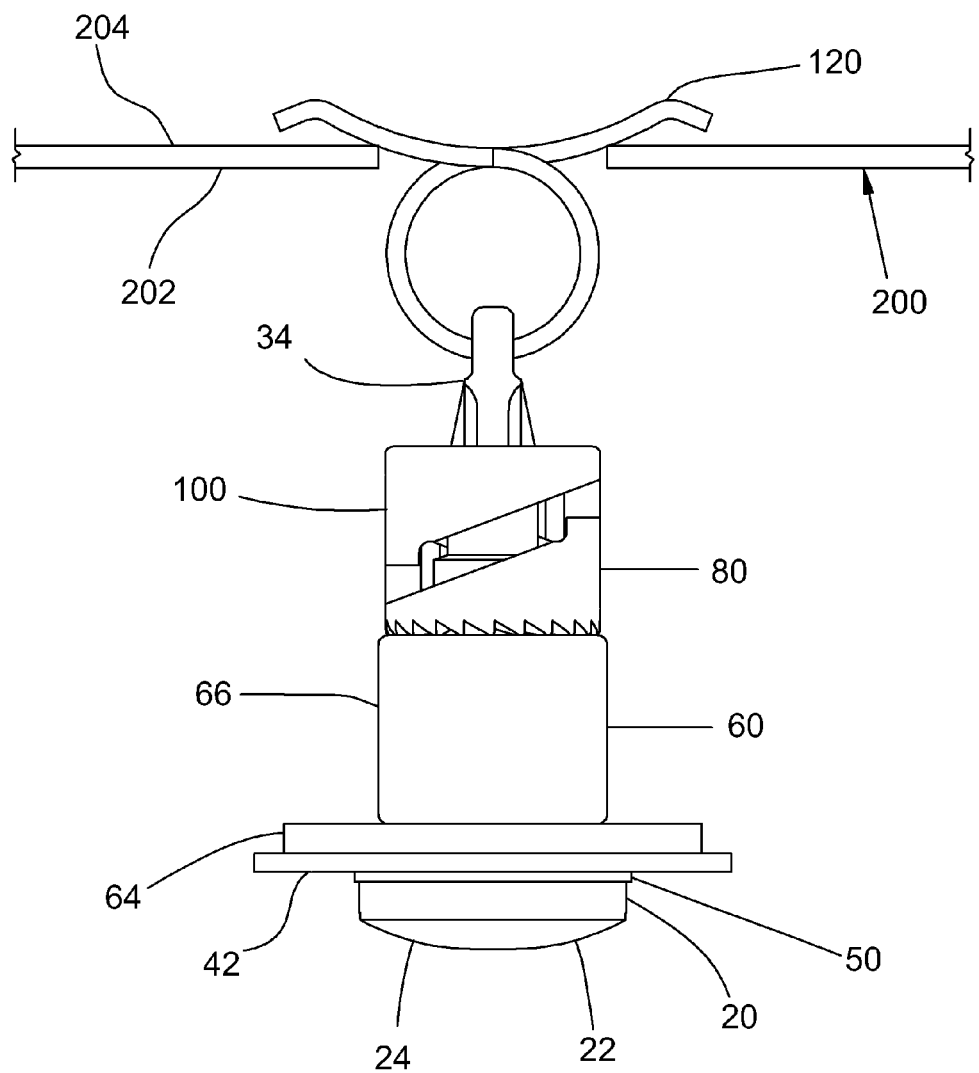
FIG. 14 is a side view, in elevation, of a drain plug that is in the unlocked state and is hanging or dangling by the safety wire form.

Initially, cam member 100 is locked with cam member 80 in the first position which, as described in the foregoing description, causes an axial force to be applied to end 72 of cylindrical portion 66 thereby causing the diameter of cylindrical portion 66 to increase to diameter D3. The increase of the diameter to diameter D3 creates the seal between swell sleeve 60 and structure 200. When a user desires to open drain plug 20 to allow water, condensation or other fluids to drain from the drainage hole in structure 200, the user inserts the appropriate tool into tool receiving recess 28 of stud member 22 (see FIG. 2) and rotates stud member 22 in a counter-clockwise direction until cam member 100 is locked with cam member 80 in the second position thereby terminating the axial force previously applied to end 72 of cylindrical portion 66. As a result, the diameter of cylindrical portion 66 returns to diameter D2 thereby terminating the seal between swell sleeve 60 and the drainage hole in structure 200. Referring to FIG. 14, once the diameter of cylindrical portion 66 returns to diameter D2, drain plug 20 can be pulled outward from the drainage hole in structure 200. Since safety wire form 120 has a length L1 that is about the same as diameter D1 of washer portion 64, safety wire form 120 prevents drain plug 20 from completely falling out of the drainage hole in structure 200 and either becoming lost or contaminated. This is especially important because there may be instances when a large quantity of fluid rushes out through the drainage hole when drain plug 20 is loosened or unlocked. FIG. 13 shows a perspective view of aircraft structure 200 having a plurality of drain plugs 20 mounted thereto. Side 204 of structure 200 is the interior side and side 202 (see FIG. 12A) is the exterior side of structure 200. Thus, drain plugs 20 are actually upside down when in use. Head portion 24, face plate 42, friction washer 50, and washer portion 64 are on the exterior side 202, and cylindrical portion 66, cam members 80 and 100, shaft 32 and safety wire form 120 are located on the interior side 204. Safety wire form 120 prevents drain plugs 20 from falling out of the openings in structure 200 when the drain plugs 20 are unlocked and loosened (see FIG. 14). As shown in FIG. 12A, face plate 42 protects washer portion 64 and also evenly distributes compressive forces on washer portion 64.

Figure 6A:
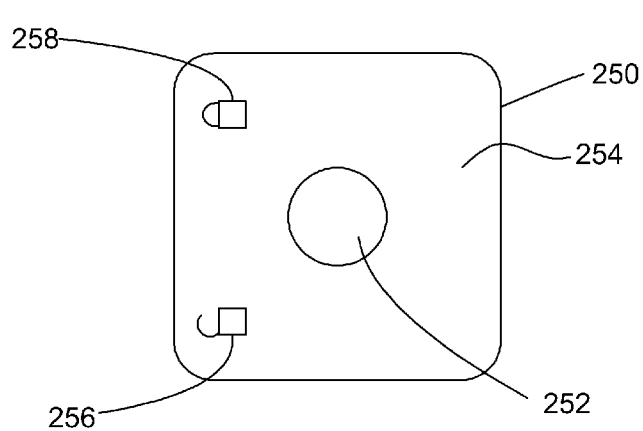
FIG. 6A is a top view of a face plate in accordance with another embodiment of the invention, the face plate having lock and unlock imprints thereon.
Figure 6B:
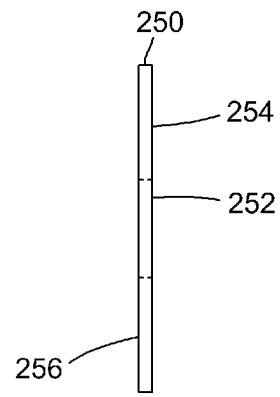
FIG. 6B is a side view, in elevation, of the face plate shown in FIG. 6A.
Figure 7:
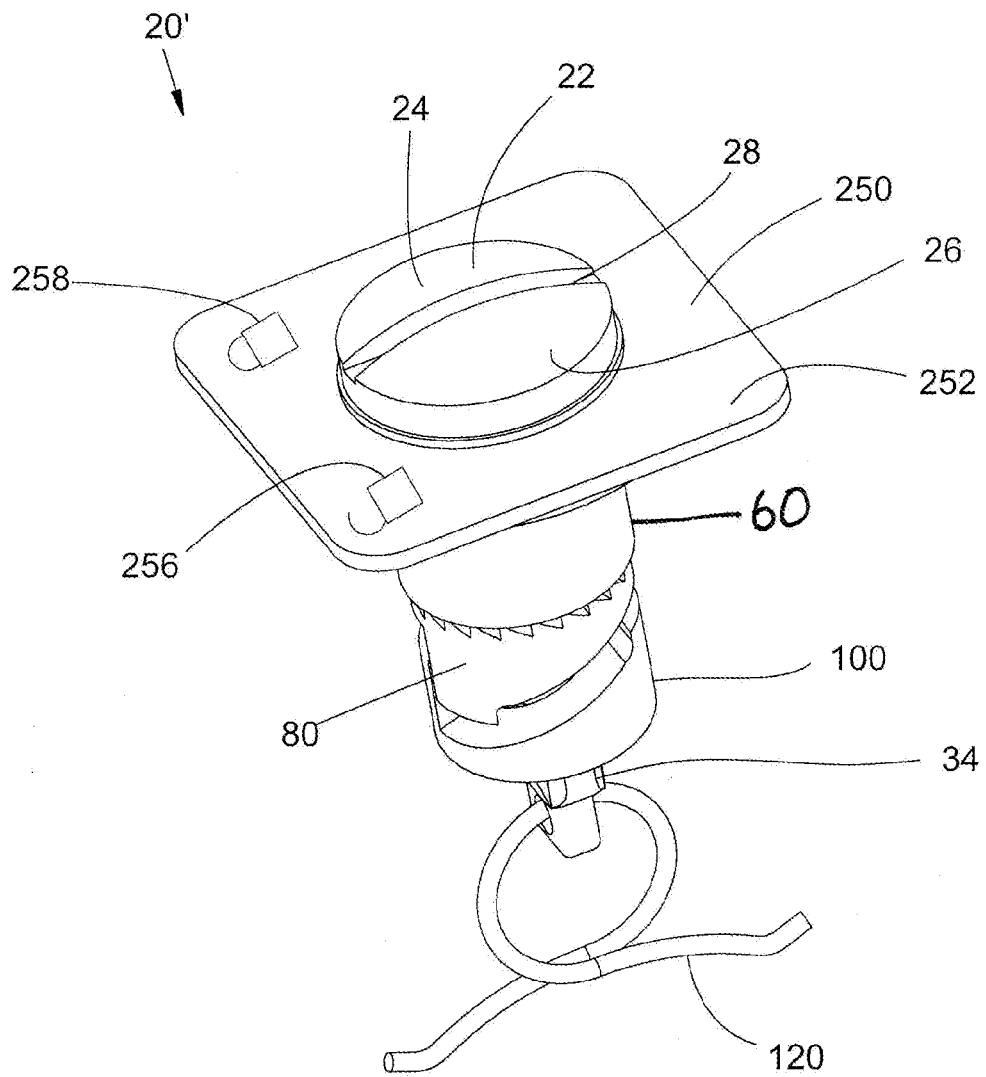
FIG. 7 is a perspective view of the drain plug of the present invention using the face plate of FIG. 6A.

Referring to FIGS. 6A and 6B, there is shown face plate 250 in accordance with another embodiment of the invention. Face plate 250 has substantially the same structure as face plate 42 but face plate 250 includes additional features. Face plate 250 is mounted on stud member 22 in the same manner as face plate 42. Face plate 250 has central opening 252 which provides the same function as central opening 44 of face plate 42. Face plate 250 includes top side 254 and bottom side 256. Face plate 250 further includes imprints 256 and 258 that are formed in top side 254. Imprint 256 indicates the direction in which stud member 22 must be rotated in order to unlock and loosen drain plug 20. Imprint 258 indicates the direction in which stud member 22 must be rotated in order to lock and close drain plug 20. In one embodiment, face plate 250 is fabricated from aluminum. Imprints 256 and 258 may be formed in face plate 250 by any suitable method or technique. Referring to FIG. 7, there is shown drain plug 20' that utilizes face plate 250.

The drain plug of the present invention is significantly lighter in weight than prior art drain plugs. In one embodiment, the drain plug of the present invention weighs about 5.3 grams. Since an aircraft can use hundreds of drain plugs, the total reduction in weight realized by use of the drain plug of the present invention can result in the significant reduction in aircraft fuel consumption. For example, reducing the weight of an aircraft by four (4) pounds can realize a cost savings of about $1,000,000 over a period of one year. The drain plug of the present invention has a relatively lower manufacturing cost compared to prior art drain plugs.

Although the invention has described as being useful in the aircraft industry, it is to be understood that the drain plug of the present invention has many applications and thus, may be used in other industries, e.g. automotive, boating, air-conditioning, etc.

The principles, preferred embodiments and modes of operation of the present invention have been described in the foregoing specification. This invention should not be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

What is claimed is:

1. A drain plug for use in a drainage hole in a structure that has an interior side and an exterior side, the drain plug comprising:

a stud member comprising a head portion, wherein the head portion has a top side and a bottom side, the top side having a tool receiving recess for receiving a tool;

a shaft joined to the bottom side of the head portion, the shaft comprising a first section, an intermediate section having a predetermined size and geometrical shape, and a distal end section attached to the intermediate section, wherein the intermediate section is between the first section and distal end section, the distal end section having a through-hole therein;

a resilient swell sleeve frictionally mounted on the first section of the shaft, wherein the swell sleeve has a centrally located, axially extending bore through which the shaft is disposed, the swell sleeve comprising a washer portion having a first diameter, an interior side and an exterior side, the swell sleeve further comprising a cylindrical portion joined to the interior side of the washer portion and having a lengthwise end and a second diameter that is less than the first diameter, wherein the second diameter allows the cylindrical portion to fit through a drain opening in a structure while the first diameter of the washer portion prevents the washer portion from passing through the drainage hole in the structure, wherein the interior side of the washer portion contacts the portion of the exterior side of the structure that surrounds the drainage hole, the swell sleeve being fabricated from a resilient material that allows the cylindrical portion to compress when an axial force is applied to the lengthwise end of the cylindrical portion such that the diameter of the swell sleeve increases to a third diameter that is greater than the second diameter, wherein the third diameter prevents removal of the drain plug from the drainage hole and creates a high-integrity sealing relationship between the swell sleeve and the drainage hole;

a first cam member that is mounted on the first section of the shaft and which abuts the lengthwise end of the swell sleeve, wherein the first cam comprises a pair of cam surfaces, a pair of corresponding cam detents and a pair of corresponding cam stops, and an end having a plurality of projections thereon that sink into the resilient material of the swell sleeve when an axial force is applied to the first cam member so as to prevent the swell sleeve from rotating about the shaft;

a second cam member mounted on the intermediate section of the shaft and having a pair of cams that engage the cam surfaces of the first cam member, the predetermined size and geometrical shape of the intermediate section causing the second cam member to rotate with the shaft when the shaft is rotated; and wherein when the stud member is rotated in a first direction, the cams of the second cam member move upon the cam surfaces of the first cam member in a first direction so as to exert an axial force upon the first cam member and the swell sleeve and cause the diameter of the cylindrical portion of the swell sleeve to increase to the third diameter, and wherein when the stud member is rotated in an opposite second direction, the cams of the second cam member move upon the cam surfaces of the first cam member in the opposite, second direction so as to terminate the axial force on the first cam member thereby allowing the diameter of the cylindrical portion of the swell sleeve to return to the second diameter.

2. The drain plug according to claim 1 further comprising a face plate mounted to the shaft and located between the bottom side of the head portion of the stud member and the exterior side of the washer portion of the cylindrical portion of the swell sleeve, the face plate evenly distributing compressive forces upon the washer portion.

3. The drain plug according to claim 2 wherein the top side of the face plate has imprints thereon to indicate the directions in which the stud member must be rotated to unlock the drain plug or to lock the drain plug.

4. The drain plug according to claim 2 further comprising a friction washer located between the face plate and the head portion of the stud member.

5. The drain plug according to claim 1 wherein the face plate has radiused corners.

6. The drain plug according to claim 1 further comprising a safety wire member disposed through the through-hole of the distal end section of the shaft, the safety wire member having a size that is greater than or equal to the size of diameter of the washer portion so as to prevent the drain plug from becoming completely dislodged from the drainage hole when the diameter of the cylindrical portion of the swell sleeve is equal to the second diameter.

7. The drain plug according to claim 6 wherein the safety wire member is fabricated from metal.

8. The drain plug according to claim 6 wherein the safety wire member is fabricated from composite material.

9. The drain plug according to claim 1 wherein the plurality of projections on the end of the first cam member are equidistantly spaced.

10. The drain plug according to claim 1 wherein the first section of the shaft is generally cylindrical in shape.

11. The drain plug according to claim 1 wherein the stud member is fabricated from aluminum.

12. The drain plug according to claim 1 wherein the stud member is fabricated from a composite material.

13. The drain plug according to claim 1 wherein the resilient swell sleeve is fabricated from fluorosilicone rubber.

14. The drain plug according to claim 1 wherein the first and second cam members are fabricated from composite material.

* * * * *